United States Patent
Tracy et al.

[11] 3,908,724
[45] Sept. 30, 1975

[54] APPARATUS FOR CONTOURING SURFACES OF ARTICLES

[75] Inventors: Robert W. Tracy, Haverhill, Mass.; Richard D. Cushing, Newton, N.H.

[73] Assignee: Circle Machine Co., Inc., Seabrook, N.H.

[22] Filed: Mar. 25, 1974

[21] Appl. No.: 454,217

[52] U.S. Cl. .................................. 144/143; 29/76
[51] Int. Cl.² .................. B27C 5/00; B23D 67/00
[58] Field of Search ............... 29/76; 12/87, 88, 89; 69/1; 144/2 R, 143, 144, 144.5, 145

[56] References Cited
UNITED STATES PATENTS

| | | | |
|---|---|---|---|
| 2,678,669 | 5/1954 | Witt | 144/144 R |
| 2,805,693 | 9/1957 | Joiner, Jr. | 144/145 R |
| 2,906,305 | 9/1959 | Quirk et al. | 144/145 R X |
| 2,984,271 | 5/1961 | Joiner | 144/143 |
| 3,393,719 | 7/1968 | Rhodes et al. | 144/145 R X |

FOREIGN PATENTS OR APPLICATIONS

| 314,048 | 8/1919 | Germany | 144/144.5 |
|---|---|---|---|

*Primary Examiner*—Harrison L. Hinson

[57] ABSTRACT

Apparatus for shaping a surface of an article such as a shoe sole platform has a carriage reciprocable between a loading and unloading position and a remote position. The carriage has a work holder operable to clamp in place an article positioned therein. The path of the carriage is so spaced relative to the periphery of a rotatable cutting member that the clamped article is engageable therewith as the carriage is reciprocated and the carriage has a cam operable to control the position of the cutting member relative to the article and thereby control the contouring of its exposed surface as it is reciprocated. Control means are operative to effect an operating cycle in which the article is clamped, the carriage reciprocated, and the article unclamped when the carriage returns to its starting position. The path of the carriage is shown as below the rotatable member with the work holder holding the clamped article in a rearwardly and upwardly inclined position.

22 Claims, 12 Drawing Figures

APPARATUS FOR CONTOURING SURFACES OF ARTICLES

BACKGROUND OF THE INVENTION

In the production of platforms for shoe soles, blanks of the correct outline are cut by dies from sheet material of a predetermined thickness, the material typically a cork or rubber composition. The inner and outer surfaces are then finished by separate operations, the former to be slightly concave and the latter to have a contour appropriate for the forepart of the sole structure in which the platform is to be incorporated.

While machines are available for contouring platform blanks, as far as we are aware, blanks are more commonly contoured by two manual operations, the first, a contouring step using a band saw and the second one, a finishing or sanding step, a procedure making it practically impossible to produce identical contours.

THE PRESENT INVENTION

The general objective of the present invention is to provide contouring apparatus operable to contour a surface of an article, quickly, safely, and accurately, the apparatus being herein discussed with particular reference to the contouring of platforms for shoe sole structures but well adapted for other uses.

In accordance with the invention, this objective is attained with apparatus having a carriage reciprocable between a loading and unloading position and a remote position with its path in predetermined relation to a rotatable member operable to attack and remove material from the surface of the article to be contoured. The carriage has a work holder including clamping members having article receiving and article clamping relationships and holding the article in a position such that, as the carriage travels, the surface of a clamped article that is to be contoured engages the rotatable members. The apparatus includes cam means by which the engagement of the rotatable member and said surface is controlled to effect the desired contour and control means are provided that are operable to effect an article contouring cycle during which an article is clamped to the work holder, the carriage is reciprocated, and the article released on return of the carriage to its forward position. Best results are attained when one end of the article is much thicker than the other with the article held in an upwardly inclined position while being contoured and an upwardly and forwardly inclined position is preferred as affording convenience to the operator in loading and unloading the work holder.

Another objective of the invention is to facilitate the proper location of an article in the work holder until it is secured by the clamping members. This objective is attained by providing the rear end of its work holder with a vertically reciprocable stop yieldably held in an inoperative position. Means operable, when the carriage is at its loading or unloading position, raise the stop so that it is engageable by an end of the article as it is positioned in the work holder between the clamping members thus to ensure its correct position when clamped in place.

Another objective of the invention is to ensure effective and efficient operation of the apparatus, an objective attained with the cam means comprising a cam carried by the carriage and a cam follower carried by a counter-balanced support for the rotatable member and its motor.

Another objective of the invention is to provide a carriage that is adapted to meet a wide range of operating requirements. This objective is attained with the carriage comprising a work holder, a support therefor to which the work holder is connected, and a receiver slidably connected to the slideway and to which the support is adjustably connected for movement lengthwise thereof and which carries the cam.

Another objective of the invention is to provide a work holder that securely holds the article while facilitating its loading and unloading, an objective attained by providing the forward end of the work holder with an air operated, piston-cylinder unit having a connection including a laterally reciprocable slide to which one of two clamping members is attached for movement towards and away from the other clamping members, both clamping members being detachably mounted on studs.

Another objective of the invention is the provision of an air operated system to effect the contouring cycle, an objective attained by the use of double-acting, air operated units, one to effect carriage reciprocation and another to effect the clamping of an article to the work holder and its subsequent release. An air system includes a branch supplying operating air through four-way valves to the units, one such valve for each unit, and control branches, each including a normally closed control valve, one control valve at each end of the path of the carriage and opened when the carriage reaches that end, one actuated by the operator and setting said valves to cause the clamping of the article to the work holder and initiating the travel of the carriage toward its remote position and one actuated by the operator if necessary to interrupt a cycle and the carriage to its loading and unloading position. The normally closed valve opened at the loading and unloading position effects the release of the clamped article and that opened at the remote carriage position sets the appropriate four-way valve to effect the return of the carriage.

Yet another objective of the invention is to ensure safe operation, an objective attained by spacing the loading and unloading station a safe distance from the rotatable member and providing a two speed rate of travel of the carriage, an initial high rate until the article is about to be engaged by the rotatable member and a slower rate while it is being contoured.

BRIEF DESCRIPTION OF THE DRAWINGS

In the accompanying drawings, a preferred embodiment of the invention is shown

THE PREFERRED EMBODIMENT OF THE INVENTION

Figure 1:
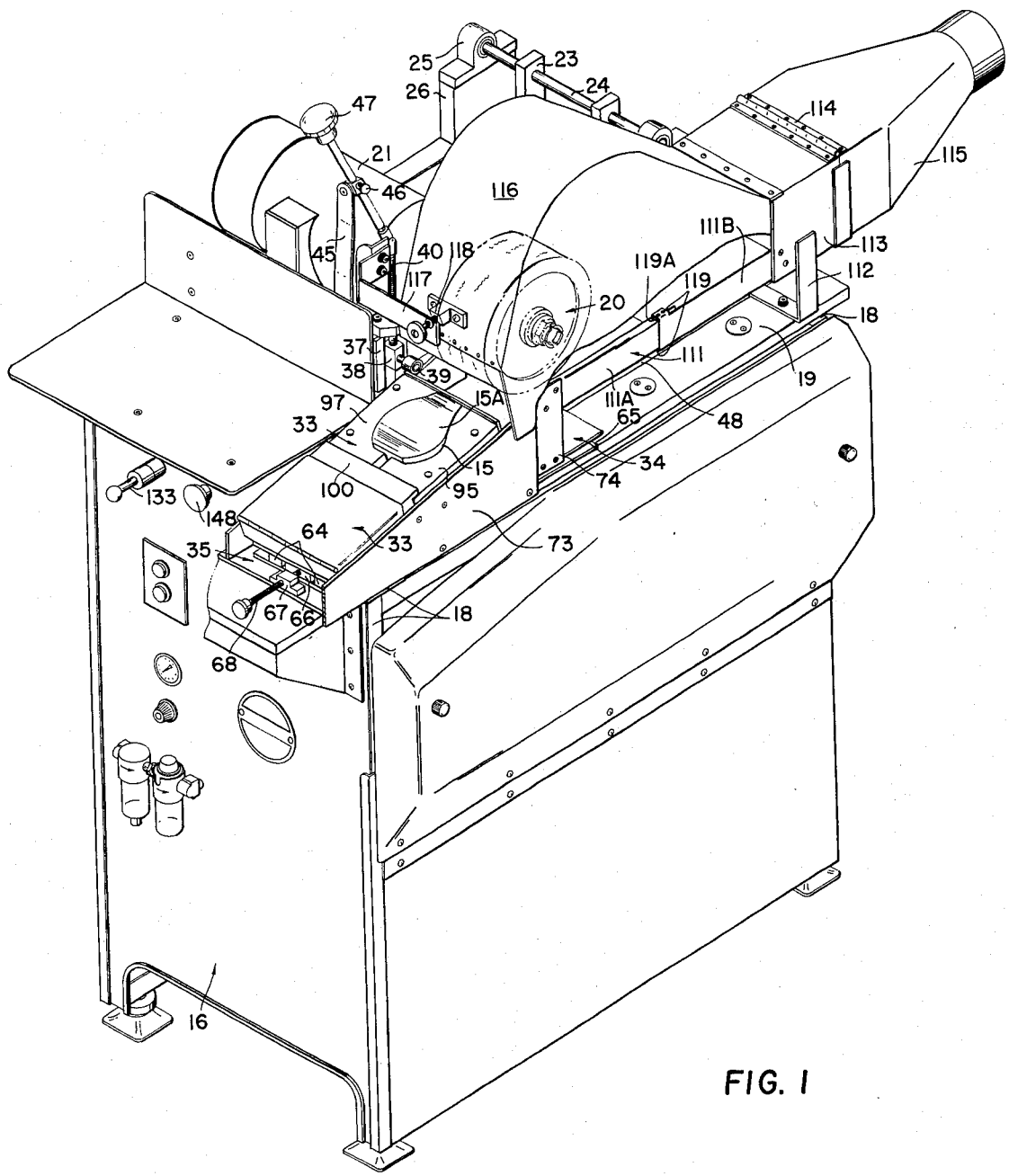
FIG. 1 is a front, perspective view of the apparatus.

The apparatus shown in the drawings is for use when the articles to be contoured are for shoe sole components of which plateforms are the disclosed example. Such a plateform 15 is die cut from a sheet of a material that is typically either a cork or rubber composition and when finished has a concave upper or inner surface and a bottom surface 15A that is contoured lengthwise. The apparatus is herein described for use in effecting the contoured bottom surface 15A and consists of a housing, generally indicated at 16 with framework 17 including a shoulder 18 for a slideway 19 that extends across the front of the apparatus below a rotatable member 20 connected to the drive shaft of a motor 21 mounted on a support 22. The rotatable member 20 is preferably and is shown of a type made inaccordance with United States letters Pat. No. 2,703,446. Such a rotatable member has its periphery formed by a series of circular blades 20A each of a wave form, thus to ensure effective removal of the platform material.

Figure 2:
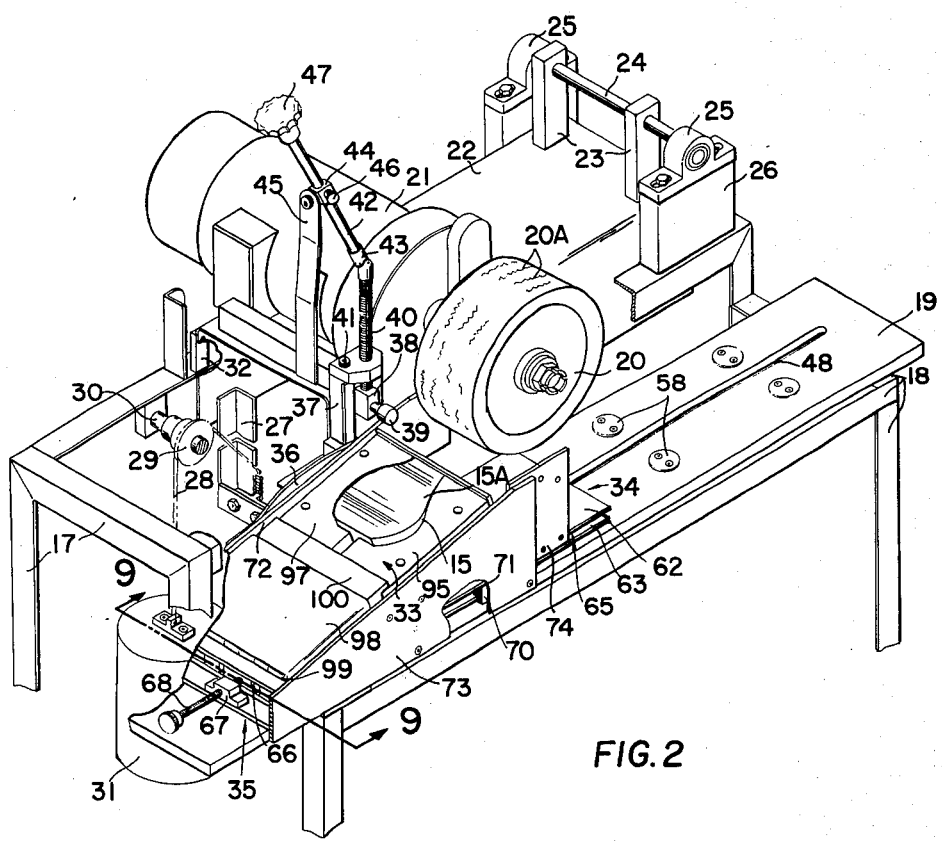
FIG. 2 is a fragmentary perspective view of the upper part thereof with certain parts removed and the framework exposed.

The support 22 has, see FIG. 2, uprights 23 at its rear end through which a shaft 24 extends with the ends of the shaft journalled in bearings 25 mounted on blocks 26 supported by the framework. At the front end of the support 22 there is a depending frame 27 to the lower end of which one end of a cable 28 is connected. The cable 28 is trained over a pulley 29 on a shaft 30 supported by the framework with its other end connected to a counterbalance 31. The front end of the support 22 is also provided with a frame-engaging stop 32 to hold the support with the rotatable member 20 in a predetermined position relative to the slideway 19.

A carriage consists of a work holder, generally indicated at 33, a support generally indicated at 34 to which the holder 33 is attached, and a receiver generally indicated at 35, to which the support 34 is connected in a manner enabling it to be adjusted lengthwise thereof. The receiver 35 is slidably connected to the slideway 19 and a cam 36 is detachably secured to the inner side of the receiver 35 in a manner later described.

The support 22 is also provided with a vertically disposed slideway 37 adjacent its forward end and the slideway 19. The slideway 37 has a slide 38 in support of a rotatable cam follower 39 having its axis parallel to that of the cutting member 20 and projecting over the inner edge of the slideway 19 for engagement with the cam 36. A screw 40 is threaded through the slideway cap 41 and is joined to a shaft 42 by a universal joint 43. The shaft 42 is held at an obtuse angle relative to the screw 40 by a holder 44 on a mount 45 attached to the support 22 and provided with a lock 46 and the shaft 42 is provided with a knob 47 exposed to enable the operator to raise or lower the cam follower 39 relative to the support 22.

From the foregoing, it will be appreciated that as the carriage is reciprocated along the slideway 19, the cutting member 20 will be raised and lowered relative thereto as determined by the particular cam 36 being used.

Figure 7:
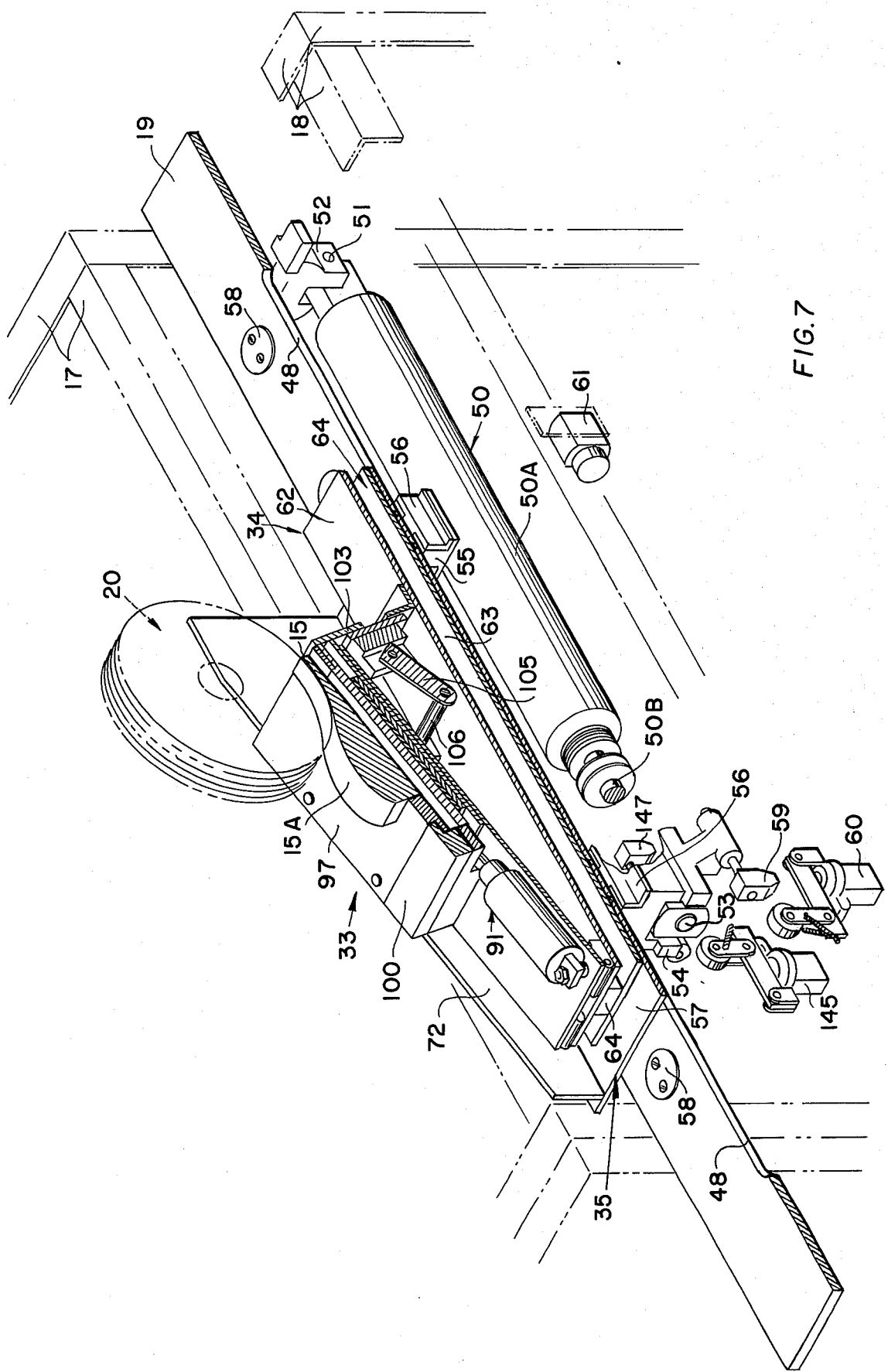
FIG. 7 is a longitudinally sectioned view of the slideway and the carriage showing the air operated means to reciprocate the carriage and the valves operated by the carriage.
Figure 8:
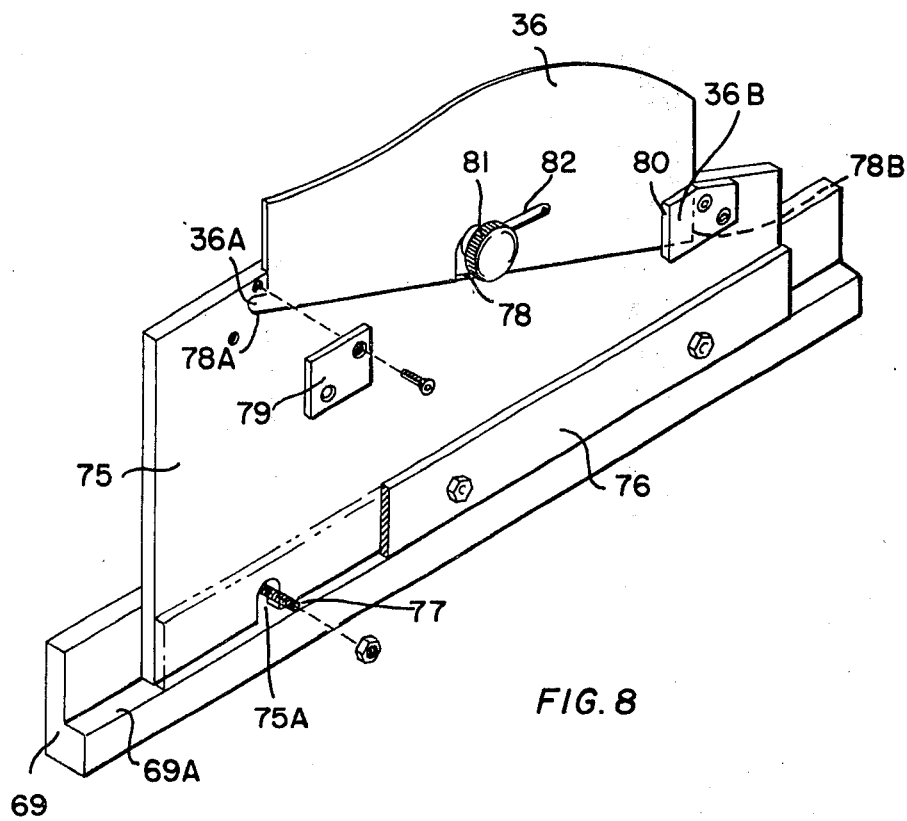
FIG. 8 is a perspective view of the cam holder with a cam detachably secured thereto.

The slideway 19 has, see FIGS. 7 and 8, a lengthwise, central slot 48 flanked by parallel ribs 49 secured to its undersurface. The cylinder 50A of a piston-cylinder unit generally indicated at 50 is positioned below the slideway 19 and pivotally connected as at 51 to a hanger 52 adjacent the rear end of the shoulder 18 while the piston stem 50B is provided with a head 53.

The slot 48 receives shouldered slides 54 and 55, both slides provided with a shield 56 of a self-lubricating material such as Teflon. The forward slide 54 is connected to the stem head 53 and both slides are attached to the undersurface of the bottom slide plate 57 of the receiver 35. The upper surface of the slideway 19 is provided with a plurality of discs 58 of an anti-friction material, Teflon, for example. The forward slide 54 is provided with an actuator 59 operable, when the carriage is in its forward position, to shift a valve 60 mounted on the framework 18, from its normal or closed position into its open position and, when the carriage is in its rearward position, actuate the valve 61, also mounted on the framework 18 from its first or closed position to effect its open position. The functions of the valves 60 and 61 will be subsequently detailed.

The support 34 of the carriage, see FIGS. 7 and 8, consists of upper and lower plates 62 and 63, respectively, both connected to intermediate spacing bars 64 spaced inwardly of their edges to provide a lengthwise channel 65. The plates 62 and 63 are dimensioned so that the support 34 is a sliding fit in the receiver 35 and at the forward end of the support 34 and between its plates 62 and 63 there is a centrally located fixed nut 66. At the forward end of the slide plate 57, there is a block 67 having a threaded bore in axial alignment with that of the nut 66 and an adjusting screw 68 is threaded through both the block and the nut to enable the operator to vary the position of the support 34 relative to the receiver 35 for reasons presently to be apparent.

Figure 9:
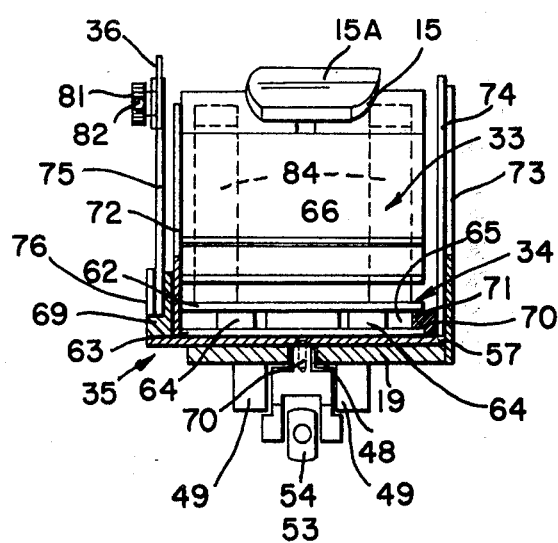
FIG. 9 is a section taken approximately along the indicated line 9—9 of FIG. 2.
Figure 10:
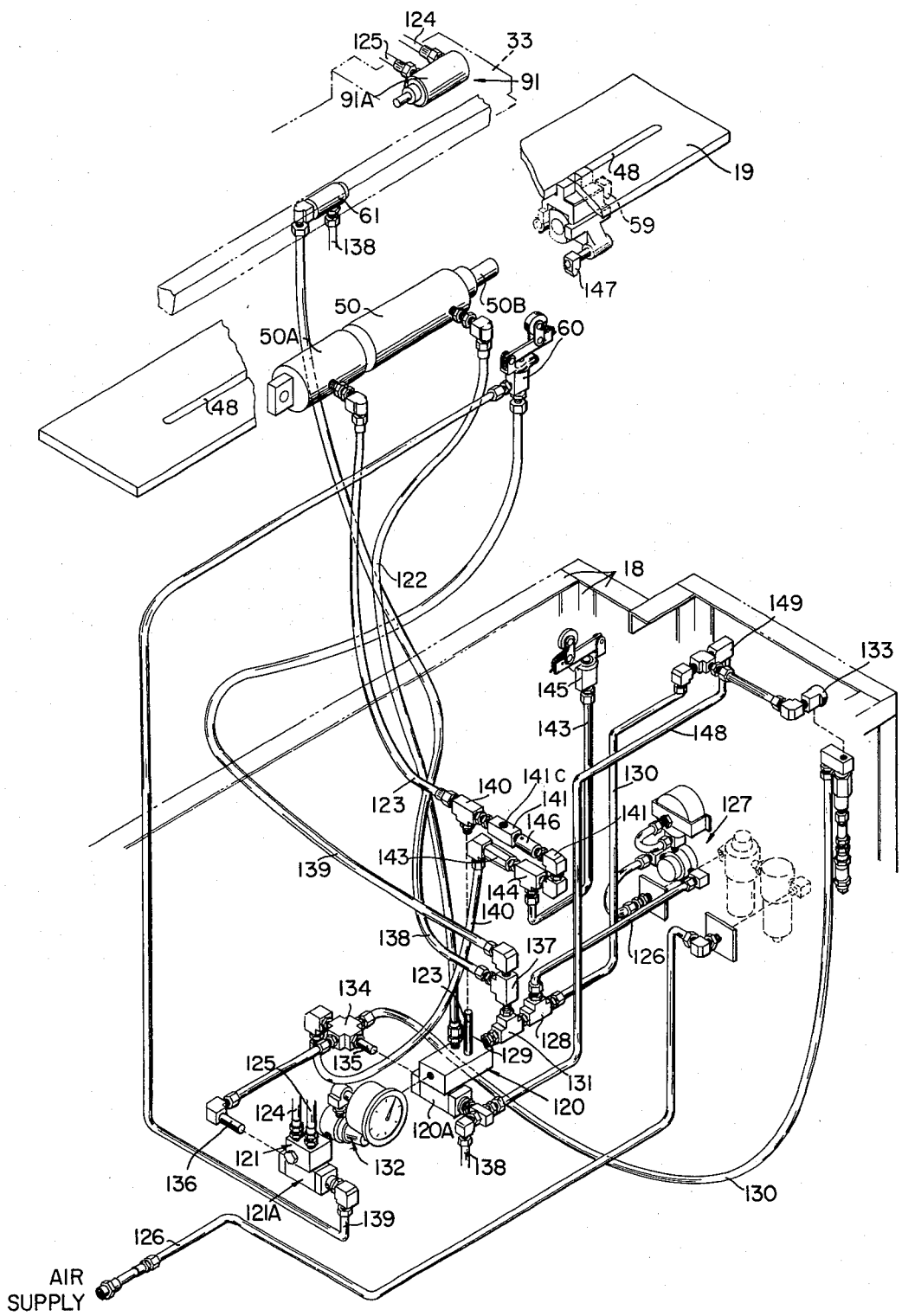
FIG. 10 is a somewhat schematic view showing the conduits for the delivery of air to the piston-cylinder units and the control conduits and valves for effecting a complete cycle once the operator initiates it.

The receiver 35 has, see FIG. 9, a bar 69 extending lengthwise of the inner edge of the upper surface of the slide plate 57 and a bar 70 extending along the outer edge of the upper surface of the slide plate 57, the bar 70 having a shoulder 71 slidably entrant of the channel 65. The receiver 35 has a slide 72 secured to the inner surface of the bar 69 while a plate 73 is secured to the outer edge of the slideway 19. The side plates are shown as tapering with their height increasing from a minimum adjacent the operator's station to a maximum height adjacent their other ends. A side 74 is connected to the rear end of the bar 70 with its rear edge in transverse alignment with that of the side 72.

A cam holder 75, similar in size and shape to the side 72, see FIGS. 8 and 9, and a retaining strap 76 are seated on the outwardly disposed shoulder 69A of the bar 69 with the bottom edge of the cam holder 75 having vertically disposed, open ended slots 75A freely receiving the screws 77 by which the retaining strip 76 is attached to the bar 69. The cam holder 75 has, in its die that is disposed away from the work holder 33 and its support 34, an upwardly opening recess 78 dimensioned to receive the lower portion of the cam 36 and to provide a seat therefor. At the higher end of the cam holder, the recess 78 has a pocket 78A, covered by a detachable keeper 79, to receive the projection 36A with which the cam 36 is provided. The other end of the recess 78 is forwardly and downwardly inclined as at 78B to be engaged by the similarly shaped portion 36B of the cam 36 which is held in place by a detachable keeper 80. With this construction, the cam holder 75 is securely held between the retaining strap 76 and the bar 69 and by the screws 77 but may be lifted therefrom but is ordinarily left in place. When the cam 36 is to be replaced, it may be lifted from the recess 78 once the connector 81 is detached, the connector 81 being desirably of a quick-release type and having an arm 82 enabling the operator to have sufficient leverage in locking or releasing it. When another cam 36 is to be used, it is inserted with its projection 36A disposed in the recess 78 and in back of the keepers so that the projection 36A enters the pocket 78A as the other end of the cam is dropped into position and the connector 81 is then again secured to lock the cam 36 to the cam holder 75.

Turning now to the work holder 33, it will be seen from FIGS. 3 – 6 and 8 that it has a floor plate 83 marginally reinforced by bars 84 the forward end of which is connected to the front end of the upper plate 62 of the support 34 by a hinge 85. Adjacent the hinge 85, the floor plate 83, see FIGS. 5 and 6, has a rectangular opening 83A. A work support consists of a first plate 86 having a relatively large forwardly opening slot 86A, a second plate 87 fitting over the plate 86 and having a relatively small, forwardly opening slot 87A and a laterally opening slideway 87B overlying the slot 86A and a third or top plate 88. The three plates are connected to the floor plate 83 by screws.

The slot 86A and the slideway 87B define a chamber in which there is a shifter 89 having a pivotal connection 89A with rhe floor plate 83 and a stud 89B which extends upwardly into a lengthwise slot 90A in a slide 90 which is within the slideway 87B.

The cylinder 91A of a piston-cylinder unit 91 is pivotally connected to the forward end of the floor plate 83 and extends across the opening 83A and the piston stem 91B is pivotally connected at 91C to the shifter 89. When the stem 91B is advanced and retracted, the shifter 89 draws the slide 90 inwardly or forces it outwardly as the stud 89B and the stem pivot 91C are at all times on the same side of the shifter pivot 89A. At the outer edge of the slide 90 there are a pair of studs 92 extending upwardly through vertically registering slots 93 and 94 opening, respectively, through the outer edges of the plates 87 and 88 with a clamping member 95 a slip fit thereon. The opposite edge of the top plate 88 is also provided with a pair of studs 96 by which the outer clamping member 97 is similarly detachably secured. The clamping members 95 and 97 are formed to grip the margins of the platform 15 without interfering with the contouring of its surface 15A. It will be apparent that when the stem of the unit 91 is advanced, the clamping member 95 is moved towards the clamping member 97 to clamp the platform 15 between them. When the stem 91B is retracted, the clamping member 95 is forced away from the clamping member 97 to release the platform 15.

In practice, a cover 98 has a hinged connection 99 with the floor plate 83 on which it rests when closed. A bridge 100 secured to the floor plate 83 overlies the stem 91B and the proximate ends of the clamping members 95 and 97.

Figure 3:
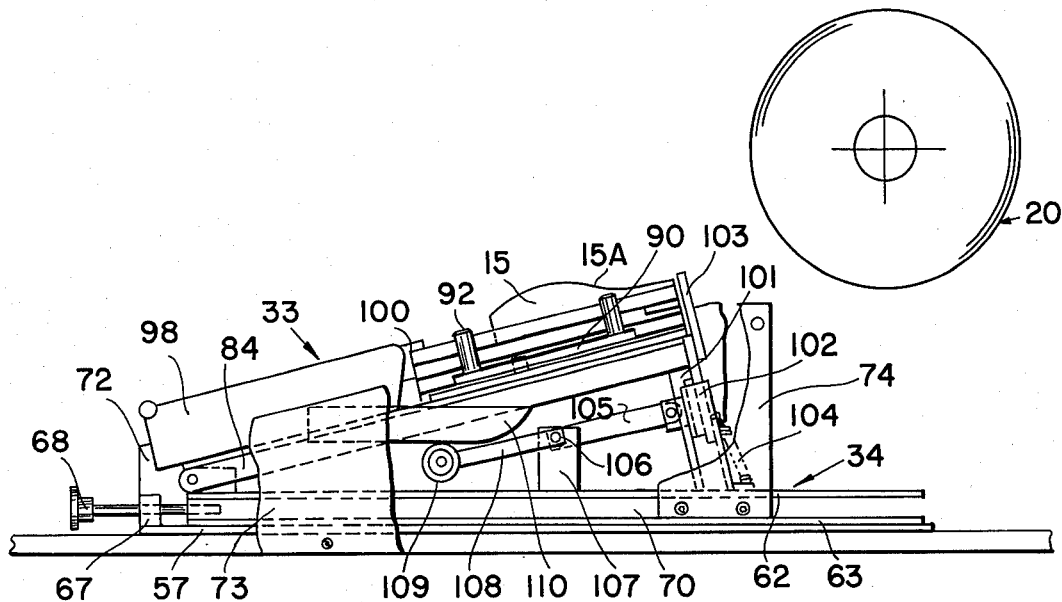
FIG. 3 is a partly sectioned side view of the carriage with the slideway broken away and the carriage in its loading and unloading position; the loading and unloading position of the carriage being shown close to the rotatable member for convenience.
Figure 4:
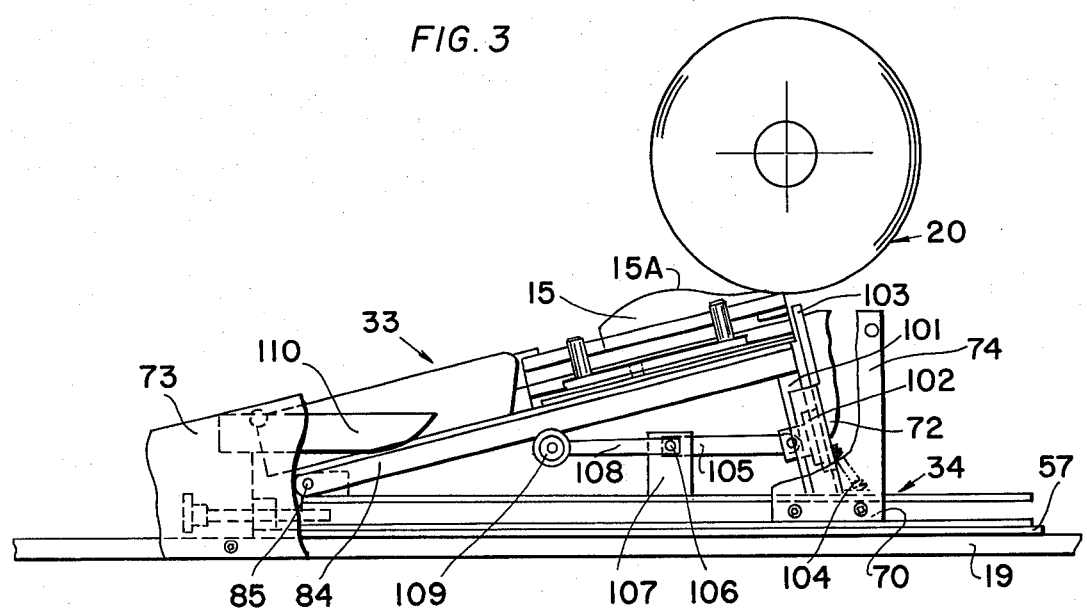
FIG. 4 is a like view but showing the contoured article at the end of its engagement with the rotatable member.
Figure 5:
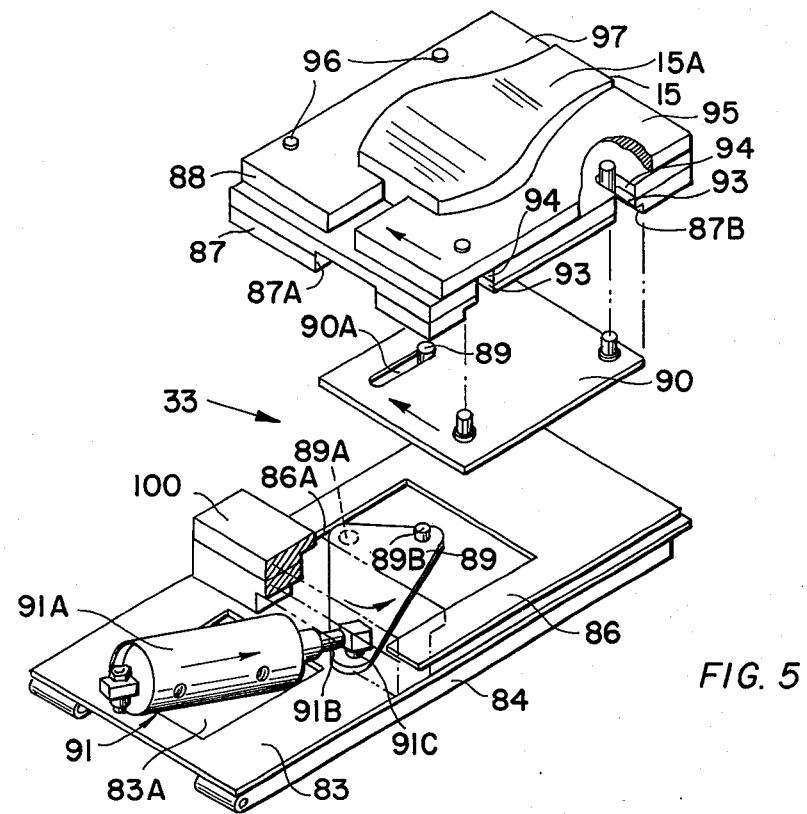
FIG. 5 is an exploded view of the work holder with its clamping members in their article clamping relationship.
Figure 6:
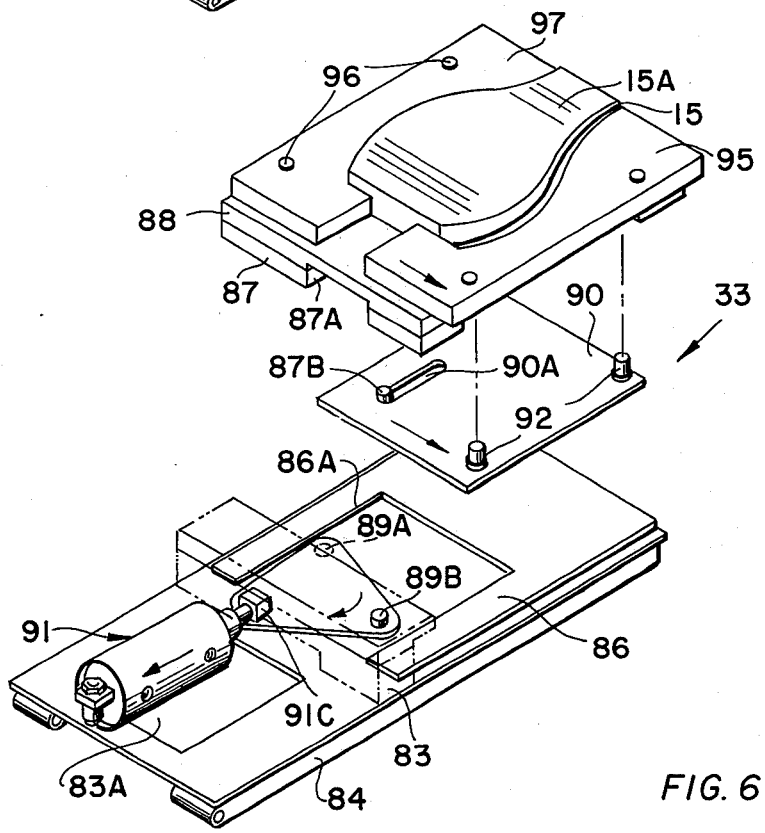
FIG. 6 is a like view but with the article clamping members inoperatively positioned.

The work holder 33 is held in its preferred, rearwardly and upwardly inclined position by a pair of transversely aligned braces 101, see FIGS. 3, 4, and 8, connected thereto and to the plate 62 of the support 34. Keepers 102 are secured to the braces 101 to provide a slideway for a slidable stop 103 that is yieldably held in its retracted, inoperative position by a spring 104 anchored thereto and to the plate 62. In its inoperative stop position, illustrated by FIG. 4, the stop 103 is close to, but below the upper ends of the clamping member 92 and 97.

An arm 105 is pivotally connected to the stop 103 and is on a shaft 106 rotatably supported by blocks 107 mounted on the plate 62. The shaft 106 has a forwardly disposed arm 108 fixed thereon and provided with a roller 109. A cam 110 fixed on the inner surface of the side plate 73 is disposed to be engaged by the roller 109 as the carriage nears its loading and unloading position then to depress the arm 108 and, accordingly, raise the stop 103 into its raised, operative position illustrated by FIG. 3 in which it is exposed above the support plate 88 and the clamping members 95 and 97 so that the operator can seat the rearward end of the platform against it to ensure its proper position, when clamped between the members 95 and 97. As the carriage leaves its forward position, the forward position, the roller 109 becomes disengaged from the cam 110 and the stop 103 is then retracted by the spring 104.

In practice, it is of course, necessary to remove the dust and particles cut from a platform 15 while it is being contoured. For that reason, the ends of the side wall of a channel generally indicated at 111 and U-shaped in cross section, are secured to the rearward ends of the sides 72 and 74 with its bottom flush with the rearward edge of the support plate 88.

Mounted on the framework at the rear end of the slideway 19 is a U-shaped holder 112 in support of an adapter 113 connected by a hinge 114 to an outlet conduit 115 connectable to an exhaust system, not shown. A hood 116, overlying the cutting member 20 and the channel 111 is seated against a support 117 to which it may be connected by the lock 118 and it may be swung upwardly free of the member 20, if service is needed. The adapter 113 receives and supports the rear end of the channel 111. At this point, it should be noted that the length of the slideway 19 is such as to provide a distance between the loading and unloading position of the carriage and the rotatable member 20 such that the operator's hands are well away therefrom while the work holder 33 is being loaded and unloaded. The channel 111, accordingly, includes sections 111A and 111B that are slidably interconnected to be telescoped and extended as the carriage is reciprocated. The forward ends of the side walls of the channel sections 111A are connected to the carriage sides 72 and 74 and the rear ends of the side walls 111B are connected to the adapter 113. The connetion 119 between the sections 111A and 111B includes an anti-friction liner 119A, conveniently of Teflon, to ensure quiet operation as the section 111A slides forwardly and rearwardly relative to the section 111B.

As compressed air is usually available, the piston-cylinder units 50 and 91 are air operated and under the control of valves 120 and 121, respectively, each of the conventional four way type that is shifted into either one of two operating positions by air under pressure. For convenience, the valve shifting means of the valves 120 and 121 are indicated at 120A and 121A, respectively. The valve 120 has conduits 122 and 123 connected to opposite ends of the cylinder 50A and the valve 121 has conduits 124 and 125 connected to opposite ends of the cylinder 91A.

An air supply conduit 126 includes a conventional pressure regulating unit 127 and a T-128 to which conduits 129 and 130 are connected. The conduit 129 includes a T-131 and is in communication with the valve 120 and, through a pressure regulator 132, the valve 121 and is the conduit supplying the air by which the units 50 and 92 are operated.

The conduit 130 is provided with a normally closed valve 133 of the push button type mounted on the front of the housing 16 to be actuated by the operator to initiate an operating cycle. The conduit 130 includes a four way connector 134 having a branch 135 connected to one end of the valve shifter 120A of the valve 120 and operable to shift it so that air is delivered to the cylinder 50A through the conduit 122 and exhausted therefrom through the conduit 23 thus to drive the carriage towards the member 20 and into its remote position. The connector 134 also has a branch 136 in communication with one end of the valve shifter 121A and is operable to shift it so that air is delivered through the conduit 124 to the cylinder 91A and exhausted therefrom through the conduit 125 thus to draw the clamping member 95 towards the clamping member 97.

The T-131 is connected to a T-137 to which conduits 138 and 139 are connected. The conduit 138 includes the normally closed valve 61 and is connected to the other end of the valve shifter 120A. The conduit 139 includes the normally closed valve 60 and is connected to the other end of the valve shifter 121A.

Figure 11:
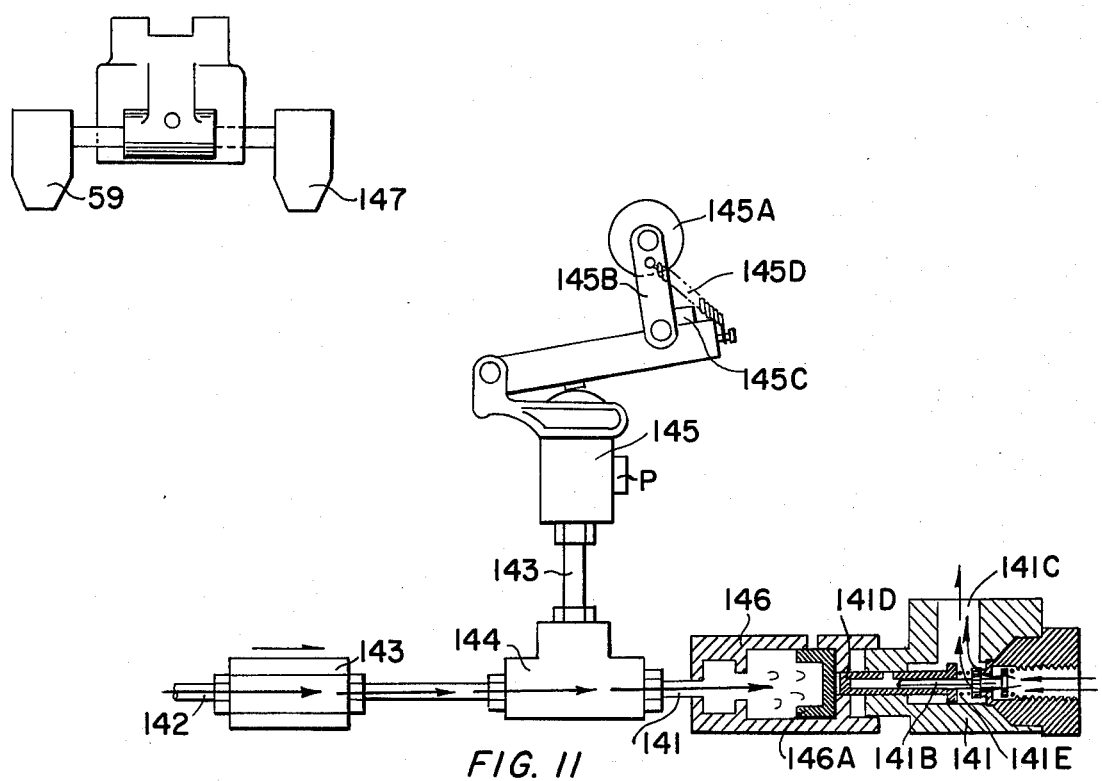
FIG. 11 is a fragmentary schematic view of the valve means providing for two-speed operation of the carriage, the view illustrating its operation in effecting the higher rate of carriage travel.
Figure 12:
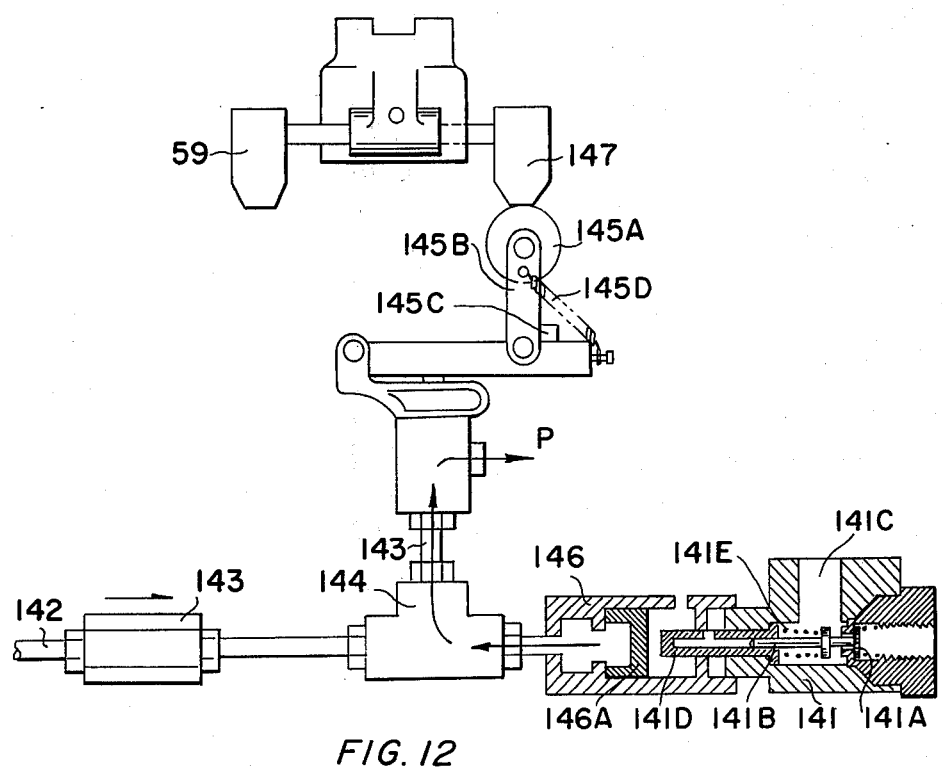
FIG. 12 is a like view illustrating the operation of the valve means in effecting the lower rate of carriage travel.

When the carriage is in its loading and unloading position, the valve 60 is closed so that the clamping portions 95 and 97 are spaced apart to receive a platform 15 or to permit its removal. When the operator closes the valve 133, air is supplied to the valve shifter 120A with the result that the carriage moves towards the rotating member 30 and air is supplied to the valve shifter 121A to effect the clamping of the platform 15 in the holder 33. When the actuator 59 engages and opens the valve 61, air is delivered to the valve shifter 120A through the conduit 138 to set the valve 120 to cause the return travel of the carriage which, on its return travel trips the valve 60 to effect the release of the contoured platform 15 and end the operating cycle. The valve 60 has a roller 60A engageable by the actuator 59 and is tripped only on the return of the carriage. The valve, except for its disposition is identical to the valve 145, best seen in FIGS. 11 and 12.

Because, for the sake of safety, the loading and unloading positions of the carriage are spaced a substantial distance from the rotating member 30, provision is made to avoid a corresponding increase in the cycle time by causing the initial travel of the carriage to be at a rate considerably faster than its rate when the platform is being contoured. In practice, the carriage travel is not accelerated during its return to its starting position. To that end, the conduit 123 is provided with a T-140 with a valve 141 in communication therewith. See FIGS. 11 and 12. The valve 141 has a spool 141A on a stem 141B and is seated to close the relief port 141C by the air pressure in the conduit 123. The valve 141 also has a tubular slide 141D receiving the stem 141B with a spring 141E between the slide and the spool 141A so that it is normally closed and is opened by pushing the slide 141D against the spring 141E if there is no opposing air pressure.

A conduit 142 in communication with the connector 134 includes a check valve 143, a T-144 and a normally closed valve 145 having a relief port P. The T-144 has a shifter 146 for the valve 141 in communication therewith and has a cup shaped piston 146A that, in response to air under pressure in the conduit 142 pushes the slide 141D to open the valve 141.

When the valve 133 is actuated to initiate an operating cycle, air is delivered into the conduit 142 with the shifter 146 opening the valve 141 as the valve 120 is shifted to effect the advance of the carriage from its starting position with the air in the conduit 142 being trapped by the check valve 143 to hold the valve 141 open and it provides for the relief of air from the cylinder 50A at a rate such that the carriage travels at a rate substantially faster than when the valve 141 is closed to require relief through the valve 120. The valve 145 is identical to the valve 60 but is oppositely disposed so that it is operated only when the carriage is traveling away from its starting position. The forward slide 54 is provided with an additional actuator 147 and the valve 145 is positioned to be tripped when the carriage has traveled a predetermined distance away from its starting position, in practice, about 5 inches. When the valve 145 is tripped, the air locked in the conduit 142 to hold the valve 141 open is itself vented and the valve 141 closed by air escaping from the cylinder 50A so that the rate of carriage travel is suitably retarded. The valve 145 has its rolls 145A engageable by the actuator 147 and mounted on a pivoted link 145B yieldably held against a stop 145C by spring 145D.

The conduit 130 is also provided with a branch 148 in communication with the valve shifter 120A and provided with a normally closed valve 149 exposed on the front panel to be opened should the operator wish to interrupt a cycle and return the carriage to its loading and unloading position. Unless the cycle is thus interrupted, once the operator opens the valve 133 after placing a platform 15 in the work holder 33, the carriage is reciprocated with the platform securely clamped to be twice subject to the contouring action of the cam positioned rotatable member 20 and released when the carriage returns to its starting position.

We claim:

1. Apparatus for contouring a surface of an article such as a shoe sole platform, said apparatus comprising a carriage reciprocable between a loading and unloading starting position and a remote position, means to reciprocate said carriage between said positions, a rotatable contouring member, means supporting said member for movement toward and away from the path of the carriage, a drive for said member, said carriage including a work holder connected thereto, said holder including means operable to clamp an article thereto, the path of said carriage being so spaced from the periphery of the cutting member that only the article is engageable therewith during carriage travel, control means operative to provide a cycle in which the carriage advanced from its starting position to its remote position and returned to its starting position, with the article clamping means operative during carriage travel and released at said starting position, and a cam carriage and operable to more the cutting member relative to the clamped article to effect the desired contour thereof during its travel.

2. The apparatus of claim 1 in which the work holder is inclined upwardly towards one end of the path of the carriage.

3. The apparatus of claim 2 in which the work holder is inclined upwardly towards the rear of said path.

4. The apparatus of claim 1 in which the work holder includes a pair of laterally spaced article clamping members to receive an article between them with the surface to be contoured exposed above them, and power operated means operable to effect an article-clamping and article-releasing relationship between them.

5. The apparatus of claim 4 in which one clamping member is fixed and the other clamping member is supported for movement laterally relative thereto and the power operated means is connected to said other clamping means.

6. The apparatus of claim 4 in which the work holder includes a rearward support for said clamping members, said rearward support having a chamber, a slideway opening through one side of the support and a forwardly opening port, both in communication with the chamber, a slide in said slideway to which one clamping member is connected and having a slot extending transversely of the slideway, a shifter in said chamber pivotally connected to the holder and including a stud entrant of said slot, and a reciprocable power operated unit pivotally connected to the forward end of the holder and extending into the chamber through the port and pivotally connected to the shifter always on the same side of the pivot axis of the shifter as the stud thereof.

7. The apparatus of claim 1 in which the carriage includes a receiver and a support slidably supported by the receiver, the work holder is connected to the support, means detachably attach the cam to the receiver at one side thereof, and an adjustable connection between the support and the receiver is operable to effect movement of the support lengthwise of the receiver and said cam.

8. The apparatus of claim 1 in which the means supporting the rotatable member is pivotally supported for movement towards and away from the path of the carriage, a counterweight yieldably opposes movement of the supporting means, and a cam follower is carried by the supporting means for engagement with the carriage.

9. The apparatus of claim 7 in which the support has a channel opening along one side, the receiver includes a side wall and a member extending lengthwise of the other receiver side, the support is dimensioned to fit between the member and the side wall with the channel proximate to the member and the member includes a shoulder entrant of the channel to hold the support in the receiver but permit its movement lengthwise thereof.

10. The apparatus of claim 7 in which the path of the carriage is below the rotatable member, the receiver includes a side wall, and the cam is mounted on the side wall.

11. The apparatus of claim 4 and a stop movable vertically relative to the rear end of the work holder between a raised operative position in which it is disposed relative to the work holder to be engaged by an article seated on the work holder between the clamping members when in their article receiving relationship but in said position engageable with the rotatable member, resilient means connected to said stop and to the carriage below the work holder and yieldably urging the stop towards said lower position in which it is not engageable with the rotatable member, said stop including a cam follower, and cam means supported by the apparatus in a position to be engaged by said cam follower as said carriage reaches its starting position and forces said stop upwardly into its operative position against the action of the resilient connecting means.

12. The apparatus of claim 1 in which the forward position of the carriage is spaced from the rotatable member a distance such that the operator's hands when loading and unloading the carriage are remote from said member and the control means provide a relatively higher rate of carriage travel until the article clamped in the work holder is substantially in engagement with the rotatable member and a substantially slower rate of carriage travel until on its return travel the article moves out of engagement with the rotatable member.

13. The apparatus of claim 9 in which the detachable connection between the cam and the receiver includes a cam holder having an upwardly opening retaining seat, the cam is held by the seat with its cam surface exposed, a single connection locks the cam to the cam holder, and the connecting means also includes an upwardly operating retaining seat receiving said cam holder and holding it against the side of the receiver against lengthwise and lateral movement with the cam surface exposed above the side wall.

14. The apparatus of claim 13 in which the seat for the cam holder is open ended and includes at least one exposed transverse member and the bottom edge of the cam holder has a vertical, open-ended slot which receives said member as the cam holder is inserted in the seat and is dimensioned to be thereby held against lengthwise movement.

15. The apparatus of claim 13 in which the seat is a recess in one side of the cam holder with a pocket at one end and an incline at the other end, keepers secured to said side overlie the ends, and the cam has a pocket-fitting projection at one end and an incline at its other end corresponding to the incline of the seat whereby the cam may be deposited in the seat only by first disposing the cam with the projection disposed to enter the pocket.

16. The apparatus of claim 1 and a slideway having a lengthwise slot, a piston-cylinder unit below said slideway, keepers slidable in said slot and extending upwardly therein and connected to the carriage, one of said keepers connected to said unit to be reciprocated thereby.

17. The apparatus of claim 1 in which the carriage includes a support to which the work holder is connected and a receiver to which the support is connected and which includes a side wall to which the cam is attached, and the slideway has a side wall, the carriage includes a stop movable vertically between an operative position and an inoperative position in which it is not engageable with the rotatable member, means yieldably hold the stop in said inoperative position, a lever pivotally mounted on the support and connected at one end to said stop, and a cam carried by said slideway wall engageable by the other end of said lever when the carriage is in its loading and unloading position and operable to actuate said lever to raise the stop into its operative position.

18. The apparatus of claim 1 in which the carriage has side walls extending above the work holder and spaced apart to accommodate the rotatable member between them and a conduit adapter is located at the remote end of the slideway, a channel is connected at one end of the carriage side walls and extends into the adapter, and a hood connected to the adapter overlies the rotatable member and the channel to define therewith a conduit for particles removed from the article by the rotatable member.

19. The apparatus of claim 18 in which the channel includes two sections, one connected to the carriage side walls and the other connected to the adapter, and means interconnecting the sections so that said one section slides within the other section as the carriage is reciprocated.

20. The apparatus of claim 1 in which the article clamping means of the carriage and the carrier reciprocating means both include double acting, air-operated piston-cylinder units, and the control means includes a conduit for air under pressure, a branch connected to said conduit and including first and second four way valves, the first for control of the carriage and the second for control of the clamping means, each valve including conduits connected to opposite ends of the cylinder of the appropriate unit and air operated means to shift the valve between first and second positions thereby to change the direction of piston travel, a branch connected to said conduit and including a normally closed valve to be actuated by the operator and the shifting means of both valves to effect their first position in which the carriage travels from its starting, loading and unloading position to its remote position and an article is clamped to the work holder, and a pair of branches connected to said conduit, each of said pair of branches including a normally closed valve and the shifting means of the appropriate one of said four way valves to effect the second position thereof, means opening the normally closed valve in the branch shifting the second four way valve into its second position when the carriage is in its starting position and means opening the normally closed valve in the branch shifting the first four way valve into its second position when the carriage reaches its remote position.

21. The apparatus of claim 20 in which the conduit providing for the escape of air from the cylinder of the unit that reciprocates the carriage when the carriage is traveling from its starting position includes a relief conduit and a venting valve in contorl thereof, said venting valve provided with a vent dimensioned to provide a rate of air relief greater than that provided by the first four-way valve and shiftable between a first position in which the vent is closed and a second position in which the vent is open, the first position effected by air pressure derived from said conduit, a branch in communication with the branch conduit in control of the shifting means that are operable to effect the first positions of said four-way valve and with said venting valve and operable to effect the second position thereof, said branch including a check valve, and a relief branch in communication with said branch between its check valve and said venting and including a normally closed relief valve, and said carriage includes an actuator for said relief valve, said relief valve and said actuator spaced and disposed so that said relief valve is tripped when the work holder reaches a predetermined position relative to the rotatable member thereby to provide an initial rate of carriage travel that is high than that wanted while the article is being contoured.

22. The apparatus of claim 1 in which the control means include additional means in control of the carriage travel in its travel away from its loading and unloading position to provide two different rates of travel, the first higher than the second and maintained until the carriage reaches a predetermined location relative to the rotatable member.

\* \* \* \* \*